(12) United States Patent
Martz et al.

(10) Patent No.: US 11,181,017 B2
(45) Date of Patent: Nov. 23, 2021

(54) SYSTEM AND METHOD FOR MAINTAINING A TEMPERATURE OF AN EMISSION DEVICE

(71) Applicant: Ford Global Technologies, LLC, Dearborn, MI (US)

(72) Inventors: Jason Brian Martz, Canton, MI (US); Eric Matthew Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 16/830,773

(22) Filed: Mar. 26, 2020

(65) Prior Publication Data
US 2021/0301690 A1 Sep. 30, 2021

(51) Int. Cl.
| F01L 13/06 | (2006.01) |
| F02D 41/02 | (2006.01) |
| F02D 41/00 | (2006.01) |
| F02D 9/06 | (2006.01) |
| F02D 13/02 | (2006.01) |
| F01N 3/20 | (2006.01) |
| F02B 37/22 | (2006.01) |

(52) U.S. Cl.
CPC ............ *F01L 13/06* (2013.01); *F01N 3/2006* (2013.01); *F02B 37/22* (2013.01); *F02D 9/06* (2013.01); *F02D 13/0226* (2013.01); *F02D 41/0002* (2013.01); *F02D 41/0077* (2013.01); *F02D 41/0235* (2013.01)

(58) Field of Classification Search
CPC ........ F01L 13/06; F01N 3/2006; F02B 37/22; F02D 9/06; F02D 13/0226; F02D 41/06; F02D 41/0002; F02D 41/0077; F02D 41/0235

USPC ........... 60/605.2, 285; 123/90.15, 198 F, 336
See application file for complete search history.

(56) References Cited

U.S. PATENT DOCUMENTS

| 5,467,748 A * | 11/1995 | Stockhausen | ........... F02D 13/06 123/198 F |
| 5,642,703 A * | 7/1997 | Stockhausen | ........... F02D 13/06 123/198 F |
| 8,899,212 B2 * | 12/2014 | Leone | ................. F02D 41/0002 123/491 |
| 9,512,797 B2 * | 12/2016 | Leone | ................. F02D 41/0002 |

(Continued)

FOREIGN PATENT DOCUMENTS

WO 2016036936 A1 3/2016

OTHER PUBLICATIONS

Gosala, D. et al., "Fuel-efficient thermal management in diesel engines via valvetrain-enabled cylinder ventilation strategies," International Journal of Engine Research, Aug. 2, 2019, 13 pages.

*Primary Examiner* — Thai Ba Trieu
(74) *Attorney, Agent, or Firm* — Geoffrey Brumbaugh; McCoy Russell LLP

(57) ABSTRACT

Methods and systems for maintaining a temperature of catalyst above a threshold temperature during vehicle braking and coasting is described. In one example, engine pumping work may be increased without increasing flow of cool fresh air through the engine's exhaust system to provide a desired level of engine braking. The net air flow through the engine may be reduced via activating a decompression actuator.

20 Claims, 7 Drawing Sheets

(56) References Cited

U.S. PATENT DOCUMENTS

| | | | | |
|---|---|---|---|---|
| 2016/0169131 A1* | 6/2016 | Doering | ................ | F02B 37/22 |
| | | | | 60/605.2 |
| 2017/0305411 A1* | 10/2017 | Leone | ................ | F02D 41/0087 |
| 2017/0356370 A1* | 12/2017 | Doering | ................ | F02D 13/04 |
| 2017/0356375 A1* | 12/2017 | Glugla | ................ | F02D 41/0087 |
| 2018/0134272 A1* | 5/2018 | Doering | ............. | F02D 41/0225 |
| 2018/0320612 A1* | 11/2018 | Ulrey | ................ | F02D 41/0077 |
| 2019/0218991 A1* | 7/2019 | Ulrey | ................ | F02D 41/0087 |
| 2019/0234317 A1* | 8/2019 | Money | ................ | F02D 13/04 |
| 2019/0271279 A1* | 9/2019 | Ulrey | ................ | F02D 41/0087 |
| 2020/0277908 A1* | 9/2020 | Glugla | ................ | F02D 41/0087 |
| 2021/0040905 A1* | 2/2021 | Glugla | ................ | F02D 41/0235 |

\* cited by examiner

SYSTEM AND METHOD FOR MAINTAINING A TEMPERATURE OF AN EMISSION DEVICE

BACKGROUND/SUMMARY

A diesel engine may be operated to provide braking to a vehicle from time to time so that vehicle speed may be reduced while the vehicle is coasting or while a brake pedal is applied. By applying engine braking, speed of a vehicle may be reduced with less reliance on foundation friction brakes. However, engine braking may allow some air to flow through the engine and the air that flows through the engine may cool a catalyst or other exhaust gas after treatment device. Cooling the exhaust gas after treatment device may not be desirable because it may reduce the efficiency of the exhaust gas after treatment device. Therefore, it may be desirable to provide engine braking while maintaining or reducing a rate of temperature drop of an exhaust gas after treatment device.

The inventors herein have recognized the above-mentioned disadvantage of conventional engine braking and have developed an engine operating method, comprising: deactivating a cylinder and reducing flow through the cylinder via holding an intake poppet valve of the cylinder open for an entire duration of a cycle of an engine that includes the cylinder in response to a vehicle braking request and a temperature of a catalyst being less than a threshold temperature; and operating an exhaust valve of the cylinder during the cycle.

By deactivating one or more cylinders and holding intake valves of the one or more cylinders open for an entire duration of an engine cycle, it may be possible to provide engine braking and maintain a temperature of an exhaust gas after treatment device. The temperature of the exhaust gas after treatment device may be maintained during engine braking via reducing fresh air flow though the exhaust gas after treatment device. In addition, different levels of engine braking may be provided via selectively deactivating different numbers of engine cylinders according to an amount of a vehicle braking request.

The present description may provide several advantages. In particular, the approach may provide engine braking and reduce a rate of temperature change of an exhaust gas after treatment device. Further, the approach may also be applied during vehicle coasting where driver demand torque is low and engine braking is not requested. In addition, the approach described herein may include application of port throttle to provide higher levels of engine braking.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description is related to operating a diesel engine that includes an exhaust gas after treatment device. The engine may be of the type shown in FIGS. 1-2B. The engine may be operated as shown in the sequences of FIGS. 3A and 3B. The engine of FIGS. 1-2B may be operated according to the method of FIGS. 4 and 5 to maintain temperatures of exhaust gas after treatment devices while providing engine braking to slow a vehicle.

Figure 1:
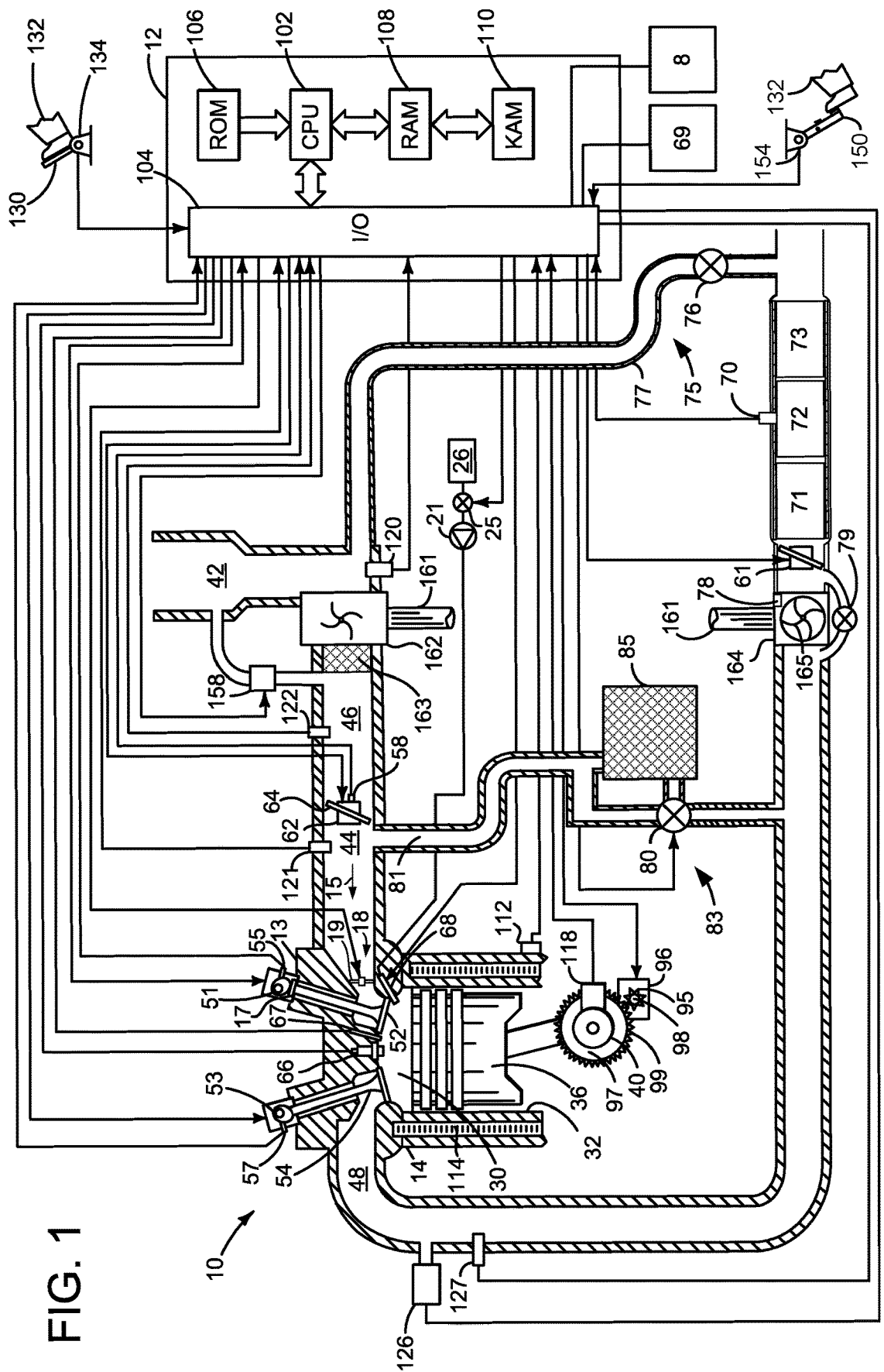
FIG. 1 shows a schematic depiction of an example engine.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57. Intake valve 52 may be held open during an entire cycle (e.g., four strokes) of engine 10 via decompression actuator 17. In one example, decompression actuator operates via providing negative lash. Engine 10 may optionally include a port throttle 19, which is positioned in intake port 18 downstream of central throttle 62 according to a direction of air flow into engine 10 as indicate by arrow 15. Intake port 18 is positioned between intake manifold 44 and cylinder 30. Port throttle 19 may selectively control flow of gases into and out of cylinder 30.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, fuel pump control valve 25, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional central electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. A position of turbine vanes 165 may be adjusted to increase or decrease speed and efficiency of turbine 164. In particular, compressor speed may be adjusted via adjusting a position of variable vane control 78 or compressor bypass valve 158. In alternative examples, a waste gate 79 may replace or be used in addition to variable vane control 78. Variable vane control 78 adjusts a position of variable geometry turbine vanes 165. Exhaust gases can pass through turbine 164 supplying little energy to rotate turbine 164 when vanes 165 are in an open position. Exhaust gases can pass through turbine 164 and impart increased force on turbine 164 when vanes 165 are in a closed position. Alternatively, wastegate 79 or a bypass valve may allow exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce the possibility of compressor surge.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, accelerator pedal position, battery SOC, etc.). Battery 8 may supply electrical power to starter 96 and controller 12 may monitor battery state of charge.

Combustion is initiated in the combustion chamber 30 when fuel automatically ignites when combustion chamber temperatures reach the auto-ignition temperature of the fuel when the piston 36 is near top-dead-center compression stroke. In some examples, a universal Exhaust Gas Oxygen (UEGO) sensor 126 may be coupled to exhaust manifold 48 upstream of exhaust gas after treatment device 71. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures a glow plug 66 may convert electrical energy into thermal energy so as to create a hot spot in the combustion chamber 30. By creating the hot spot in the combustion chamber, it may be easier to ignite the fuel spray plume in the cylinder, releasing heat that propagates throughout the cylinder, raising the temperature in the combustion chamber, and improving combustion. Cylinder pressure may be measured via pressure sensor 67.

Exhaust gas after treatment device 71 may include an oxidation catalyst and it may be followed by a SCR 72 and a diesel particulate filter (DPF) 73, in one example. In another example, DPF 73 may be positioned upstream of SCR 72. NOx sensor 70 provides an indication of NOx in engine exhaust gases. An exhaust throttle 61 may be at least partially closed to increase engine braking and at least partially opened to decrease engine braking.

Exhaust gas recirculation (EGR) may be provided to the engine via high pressure EGR system 83. High pressure EGR system 83 includes high pressure EGR valve 80, EGR passage 81, and EGR cooler 85. EGR valve 80 is a valve that closes or allows exhaust gas to flow from upstream of exhaust gas after treatment device 71 to a location in the engine air intake system downstream of compressor 162. EGR may bypass EGR cooler 85, or alternatively, EGR may be cooled via passing through EGR cooler 85. EGR may also be provided via low pressure EGR system 75. Low pressure EGR system 75 includes EGR passage 77 and EGR valve 76. Low pressure EGR may flow from downstream of emission device 71 to a location upstream of compressor 162. A charge air cooler 163 may be provided downstream of compressor 162.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human driver 132; a measurement of engine manifold pressure (MAP) from pressure sensor 121 coupled to intake manifold 44; boost pressure from pressure sensor 122 exhaust gas oxygen concentration from oxygen sensor 126; exhaust manifold pressure from pressure sensor 127; an engine position sensor from a Hall effect sensor 118 sensing crankshaft 40 position; a measurement of air mass entering the engine from sensor 120 (e.g., a hot wire air flow meter); a position sensor 154 coupled to brake pedal 150 for sensing force applied by human driver 132; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Figure 2A:
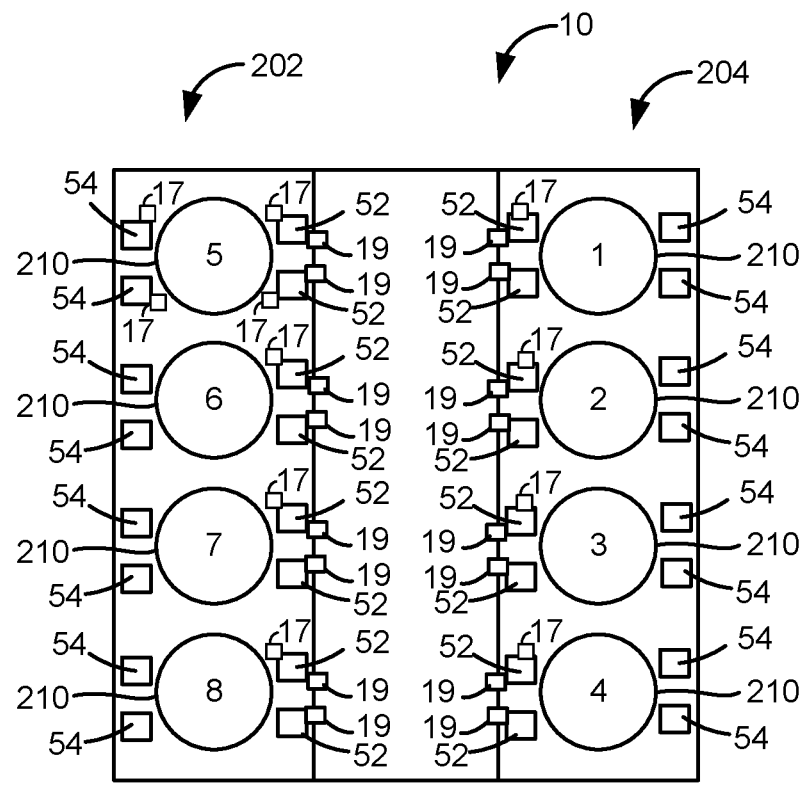
FIGS. 2A and 2B show example engine cylinder configurations.
Figure 3A:
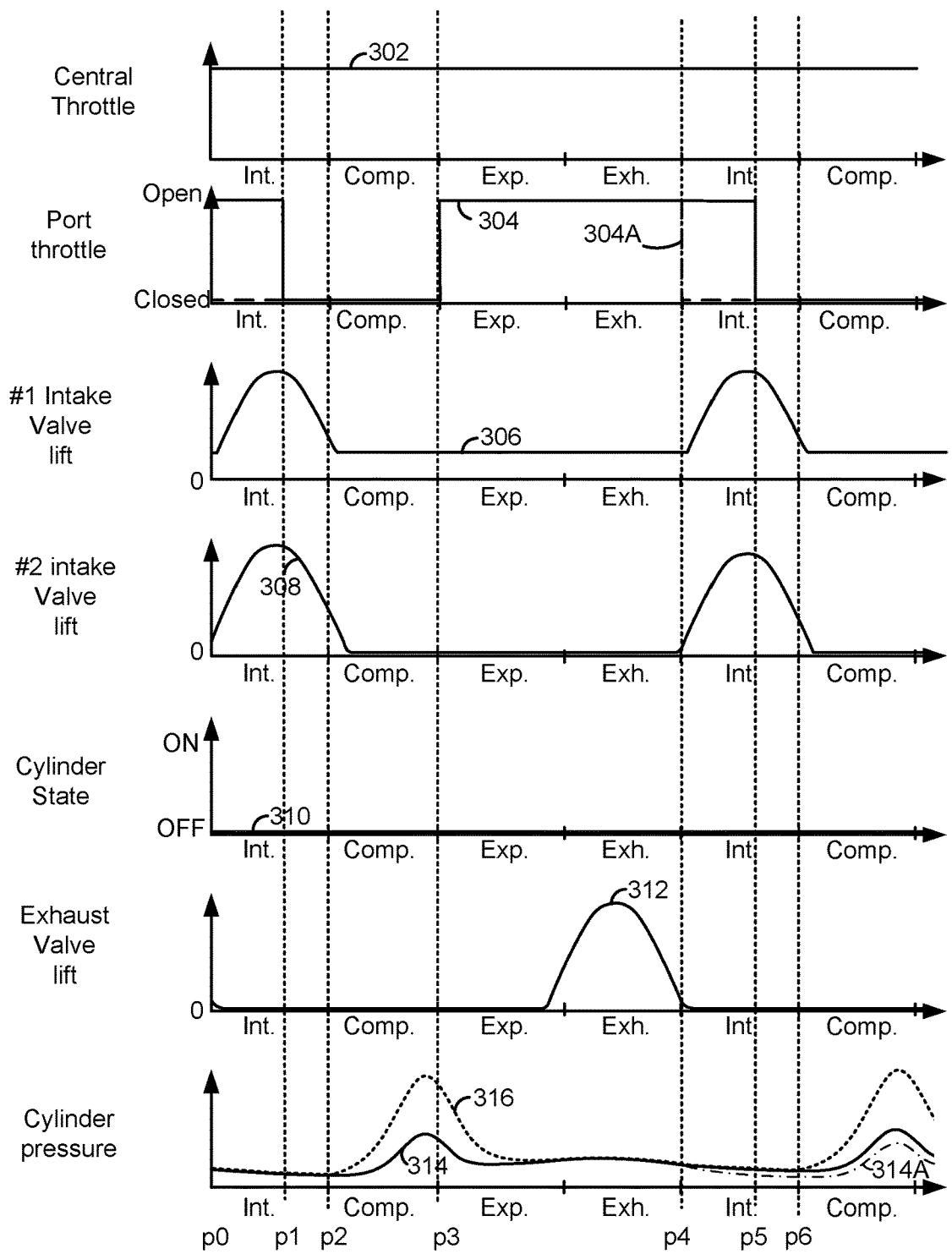
FIGS. 3A-3C show example prophetic engine operating sequences according to the present system and methods.
Figure 3B:
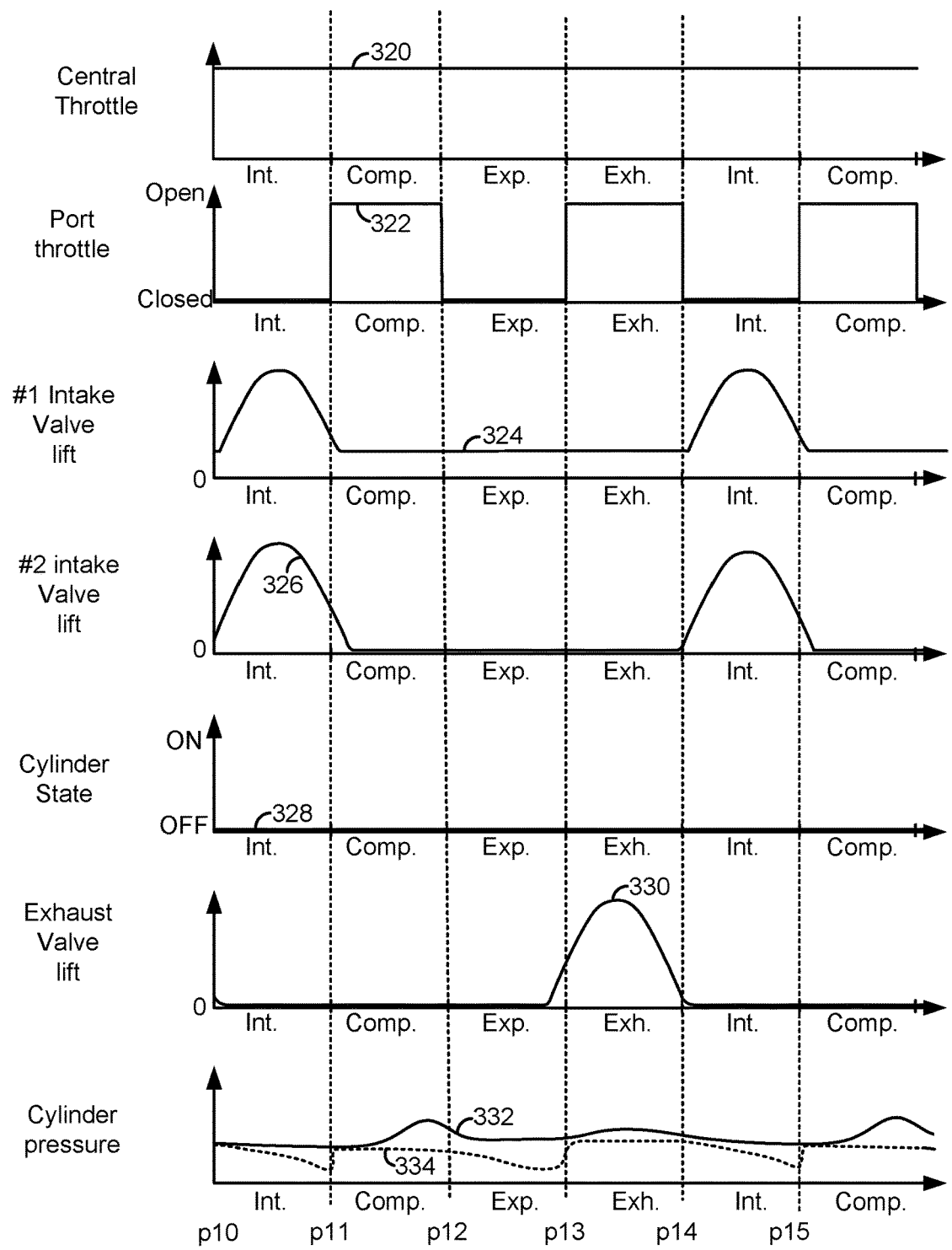

Referring now to FIG. 2A, an example multi-cylinder engine that includes two cylinder banks is shown. The engine includes cylinders and associated components as shown in FIG. 1. Engine 10 includes eight cylinders 210. Each of the eight cylinders is numbered and the numbers of the cylinders are included within the cylinders. A port throttle 19 is included with each port of each cylinder; however, fewer port throttles may be provided in some examples. Port throttles 19 selectively control flow of gases into and out of cylinders 210 via cylinder intake ports 18 shown in FIG. 1. One port throttle may restrict flow into or out of the cylinder's two intake ports. Alternatively, a port throttle may be provided for each intake port of a cylinder as shown. One or more of cylinders 1-8 may be selectively deactivated via ceasing to flow fuel to the cylinders being deactivated. For example, cylinders 2, 3, 5, and 8 (e.g., a fixed pattern of deactivated cylinders) may be deactivated during an engine cycle (e.g., two revolutions for a four-stroke engine) and may be deactivated for a plurality of engine cycles while engine speed and load are constant or vary slightly. During a different engine cycle, a second fixed pattern of cylinders 1, 4, 6, and 7 may be deactivated. Further, other patterns of cylinders may be selectively deactivated based on vehicle operating conditions. For example, cylinders of bank 202 may be deactivated while cylinders of bank 204 remain activated (e.g., receiving and combusting fuel), or vice-versa. Additionally, engine cylinders may be deactivated such that a fixed pattern of cylinders is not deactivated over a plurality of engine cycles. Rather, cylinders that are deactivated may change from one engine cycle to the next engine cycle.

Each cylinder includes two intake valves 52 and two exhaust valves 54. However, in other examples, each engine cylinder may include only one intake valve and only one exhaust valve. Each cylinder also includes at least one decompression actuator 17 that selectively holds one intake valve 52 of a cylinder open less than (e.g., 1 millimeter) a full lift height of the intake valve (e.g., 8 millimeters). Alternatively, as shown at cylinder number 5, each cylinder may include a decompression actuator 17 for each of its intake and exhaust valves. In this example, engine 10 includes a first cylinder bank 204, which includes four cylinders 1, 2, 3, and 4. Engine 10 also includes a second cylinder bank 202, which includes four cylinders 5, 6, 7, and 8.

Figure 2B:
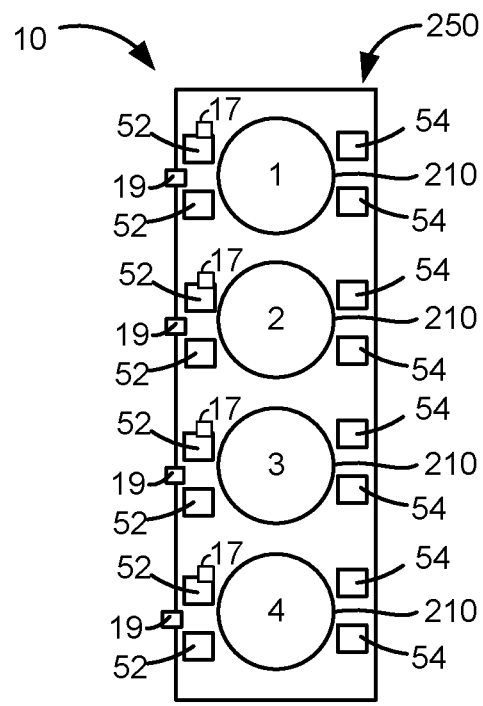

Referring now to FIG. 2B, an example multi-cylinder engine that includes one cylinder banks is shown. The engine includes cylinders and associated components as shown in FIG. 1. Engine 10 includes four cylinders 210. Each of the four cylinders is numbered and the numbers of the cylinders are included within the cylinders. A port throttle 19 is included with each cylinder; however, fewer port throttles may be provided in some examples. Port throttle 19 selectively controls flow of gases into and out of cylinders 210 via cylinder intake ports 18 shown in FIG. 1. Cylinders 1-4 may be selectively deactivated (e.g., not receiving fuel and not combusting fuel during a cycle of the engine) to improve engine fuel economy when less than the engine's full torque capacity is requested. For example, cylinders 2 and 3 (e.g., a fixed pattern of deactivated cylinders) may be deactivated during a plurality of engine cycles (e.g., two revolutions for a four stroke engine). During a different engine cycle, a second fixed pattern cylinders 1 and 4 may be deactivated over a plurality of engine cycles. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle. In this way, the deactivated engine cylinders may rotate or change from one engine cycle to the next engine cycle.

Engine 10 includes a single cylinder bank 250, which includes four cylinders 1-4. Each cylinder includes two intake valves 52 and two exhaust valves 54. However, it other examples, each engine cylinder may include only one intake valve and only one exhaust valve. Each cylinder also includes a decompression actuator 17 that may selectively hold one intake valve 52 of a cylinder open less than (e.g., 1 millimeter) a full lift height of the intake valve (e.g., 8 millimeters).

Thus, the system of FIGS. 1-2B may provide for an engine system, comprising: a diesel engine including a cylinder included in a first group of cylinders, a second cylinder included in a second group of cylinders, a central throttle, and an exhaust after treatment device, the cylinder including at an intake poppet valve and a decompression actuator to lift the intake poppet valve; a controller including executable instructions stored in non-transitory memory that cause the controller to deactivate the cylinder and other cylinders included in the first group of cylinders in response to a request for vehicle braking, and additional instructions to hold the intake poppet valve of the cylinder open during an entire cycle of the diesel engine and not to hold intake poppet valves of cylinders included in the second group of cylinders during the entire cycle of the diesel engine in response to the request for vehicle braking.

In some examples, the engine system further comprises: a central throttle, a port throttle for the cylinder, and a port throttle for each of the other cylinders included in the first cylinder group. The engine system further comprises additional instructions that cause the controller to open the port throttle for the cylinder during at least a portion of an exhaust stroke of the cylinder. The engine system further comprises additional instructions that cause the controller to fully open the central throttle while the request for engine braking is asserted. The engine system includes where the intake poppet valve is held open via the decompression actuator. The engine system further comprises additional instructions to hold the intake poppet valve of the cylinder open during an entire cycle of the diesel engine in response to a temperature of a catalyst being less than a threshold temperature.

Referring now to FIG. 3A, an engine operating sequence is shown. The sequence of FIG. 3A is for a single cylinder of an engine that has been deactivated (e.g., fuel flow to the cylinder has ceased) in response to a vehicle braking request or a low driver demand torque. One or more of the engine's cylinders may operate with conventional valve timing and lift while a cylinder is operated as shown in FIG. 3A. Further, other engine cylinders may operate as shown in FIG. 3A, but the strokes of the other cylinders are out of phase with the strokes of the cylinder shown in FIG. 3A so that the engine may generate torque at constant crankshaft angular intervals. In addition, the engine's central throttle is fully opened. The engine in this example includes port throttles. The sequences of FIGS. 3A and 3B show operation of a cylinder of a four stroke engine.

Figure 4:
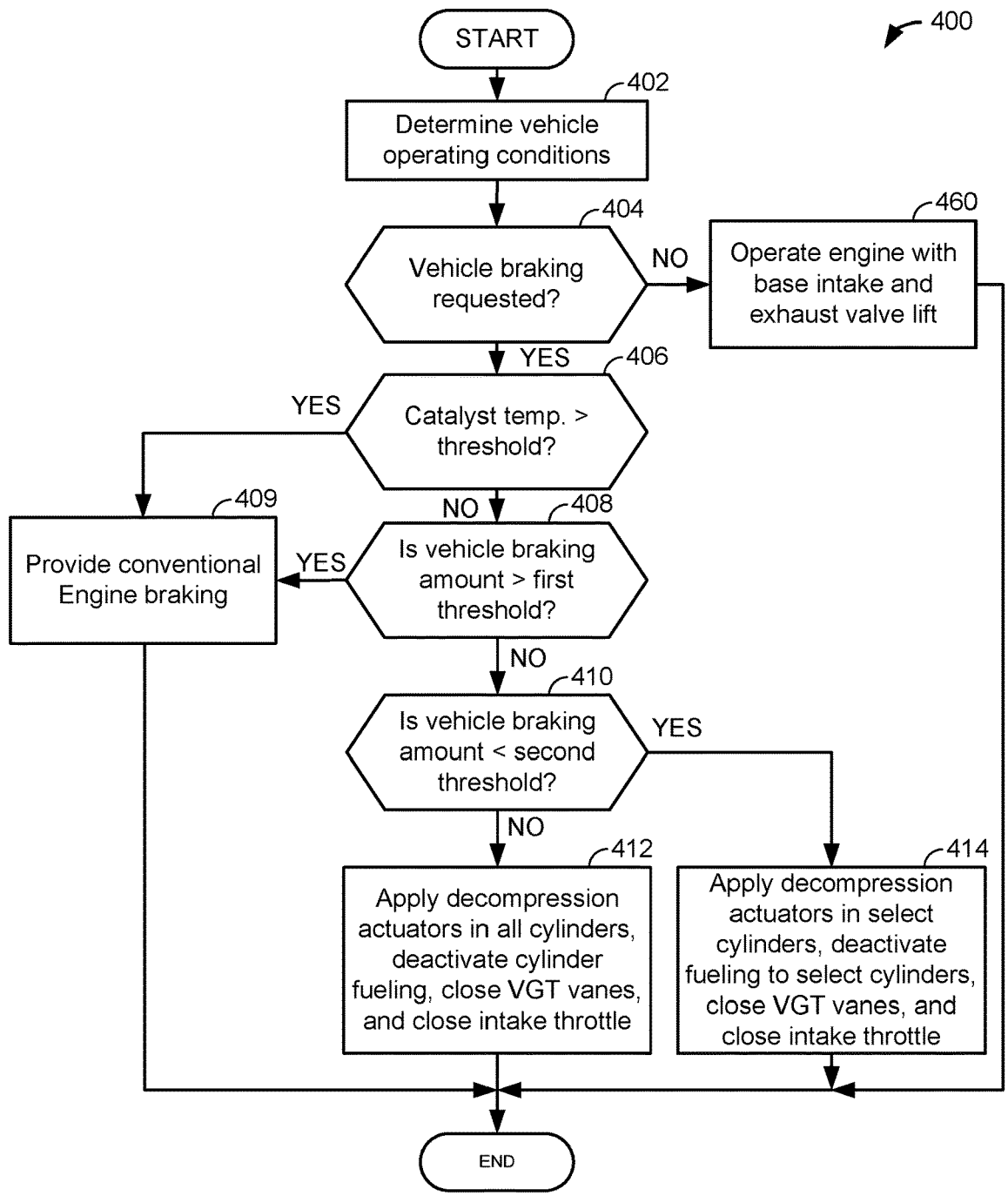
FIGS. 4 and 5 show example methods for operating an engine of the type shown in FIGS. 1-2B.

The sequence of FIG. 3A may be provided via the system of FIGS. 1-2B in cooperation with the method of FIGS. 4 and 5. The plots of FIG. 3A are time aligned and occur at a same time. Vertical lines at engine positions p0-p6 represent times of interest during the sequence. A cylinder compression stroke is indicated by the "Comp." abbreviation. A cylinder expansion stroke is indicated by the "Exp." abbreviation. A cylinder exhaust stroke is indicated by the "Exh." abbreviation. A cylinder intake stroke is indicated by the "Int." abbreviation. Vertical bars between the cylinder strokes represent top-dead-center and bottom-dead-center positions of the cylinder. The engine system described herein may operate and include non-transitory instructions to operate at all of the conditions included in the description of FIG. 3A.

The first plot from the top of FIG. 3A represents an opening amount of a central throttle. Trace 302 represents opening amount of the central throttle. The vertical axis represents the opening amount of the central throttle. The central throttle is fully closed when trace 302 is at the level of the horizontal axis. The central throttle is fully open when trace 302 is near the vertical axis arrow. The horizontal axis represents engine position, and engine position is marked to indicate a stroke that the cylinder of the engine is on. For example, at position p0, the cylinder is on its intake stroke. The engine rotates from the left side of the figure to the right side of the figure.

The second plot from the top of FIG. 3A represents an opening amount of a port throttle that is in an intake port of the cylinder. In this example, the port throttle controls air flow into the cylinder via a port leading to the first intake valve. The port throttle may restrict flow into and output of both intake ports. However, in some examples, the positions of two port throttles is indicated by trace 304 and the two port throttles may control flow into and out of the cylinder's intake ports. Trace 304 represents opening amount of the port throttle. The vertical axis represents the opening amount of the port throttle. The port throttle is fully closed when trace 304 is at the level of the horizontal axis. The port throttle is fully open when trace 304 is near the vertical axis arrow. Trace 304A represents an alternative opening amount trajectory for the port throttle. The trajectory of trace 304A is the same as that of trace 304 when trace 304A is not visible. The horizontal axis represents engine position, and engine position is marked to indicate a stroke that the cylinder of the engine is on. A small separation between the horizontal axis and trace 304 is shown to increase the visibility of trace 304 even though the port throttle is fully closed when trace 304 is near the horizontal axis.

The third plot from the top of FIG. 3A represents lift of a first intake valve of the cylinder versus engine position. The first intake valve follows a base intake valve trajectory during the intake stroke of the cylinder so that flow into the cylinder may be increased as compared to when the first intake valve lift is at the lower level. The first intake valve does not follow the base intake valve trajectory during the compression, expansion, and exhaust strokes of the cylinder. Trace 306 represents lift of a first intake valve of a cylinder. The lift amount is zero at the level of the horizontal axis and the lift amount increases in the direction of the vertical axis arrow. The lift amount is a distance of the intake valve from the intake valve seat. The lift of the intake valve is non-zero (e.g., 3 mm) throughout the cycle, as shown in the figure. The horizontal axis represents engine position, and engine position is marked to indicate a stroke that the cylinder of the engine is on.

The fourth plot from the top of FIG. 3A represents lift of a second intake valve of the cylinder versus engine position. The second intake valve follows a base intake valve trajectory throughout the sequence. Trace 308 represents lift of a second intake valve of the cylinder. The lift amount is zero at the level of the horizontal axis and the lift amount increases in the direction of the vertical axis arrow. The lift amount is a distance of the intake valve from the intake valve seat. The horizontal axis represents engine position, and engine position is marked to indicate a stroke that the cylinder of the engine is on. A small separation between the horizontal axis and trace 308 is shown to increase the visibility of trace 308 even though the second intake valve is fully closed when trace 308 is near the horizontal axis. The horizontal axis represents engine position, and engine position is marked to indicate a stroke that the cylinder of the engine is on.

The fifth plot from the top of FIG. 3A represents a plot of cylinder state versus engine position, in this case for a deactivated cylinder. The cylinder is activated (e.g., receiving and combusting fuel, and "ON" as noted in the figure) when trace 310 is at a higher level near the vertical axis arrow. The cylinder is deactivated (e.g., not receiving fuel and not combusting fuel, and "OFF", also as noted in the figure) when trace 310 is at a lower level near the horizontal axis. Trace 310 represents the state of the cylinder. The horizontal axis represents engine position, and engine position is marked to indicate a stroke that the cylinder of the engine is on.

The sixth plot from the top of FIG. 3A represents lift of exhaust valves (e.g., 54 of FIG. 1) versus engine position. Trace 312 represents the lift of first and second exhaust valves of the cylinder. The lift amount is zero at the level of the horizontal axis and the lift amount increases in the direction of the vertical axis arrow. The lift amount is a distance of the exhaust valve from the exhaust valve seat. The horizontal axis represents engine position, and engine position is marked to indicate a stroke that the cylinder of the engine is on. A small separation between the horizontal axis and trace 312 is shown to increase the visibility of trace 312 even though the exhaust valves are fully closed when trace 312 is near the horizontal axis.

The seventh plot from the top of FIG. 3A represents pressure in the cylinder. The pressure in the cylinder increases in the direction of the vertical axis arrow. The horizontal axis represents engine position, and engine position is marked to indicate a stroke that the cylinder of the engine is on. Trace 316 represents pressure in the cylinder if the engine does not include a port throttle. Trace 314 represents pressure in the cylinder when the cylinder includes a port throttle that is controlled according to trace 304 shown in the second plot from the top of FIG. 3A. Trace 314A represents pressure in the cylinder when the cylinder includes a port throttle that is controlled according to trace 304A shown in the second plot from the top of FIG. 3A. Trace 314A is equivalent to trace 314 when trace 314A is not visible.

At engine position p0, the cylinder is deactivated and other cylinders of the engine are also deactivated in a similar manner (not shown). Vehicle braking is requested (not shown) and the central throttle is fully open. The port throttle of the cylinder is fully open to allow air to flow into the cylinder during the first portion of the intake stroke of the cylinder. The lift of the first intake valve of the cylinder begins to increase as the first intake valve follows a base profile of a cam beginning at engine position p0. Prior to engine position p0, the first intake valve is held partially open via a decompression valve actuator (e.g., 17 of FIG. 1). The lift of the second intake valve continues to increase as the second intake valve follows a base profile of a cam beginning shortly before engine position p0 (not shown). The exhaust valves are near a fully closed position. Pressure in the cylinder is relatively low.

At engine position p1, the port throttle is open to allow air flow into the cylinder during the intake stroke via the first intake valve (e.g., trace 304). Optionally, the intake port throttle may be closed (e.g., trace 304A) to decrease pressure in the cylinder and increase engine braking power. The particular timing of port throttle closing for trace 304 may be adjusted to adjust the mass that is in the cylinder at the beginning of the compression stroke. The central throttle remains fully open and the first and second intake valve lifts follow a base valve lift trajectory. The cylinder remains deactivated and the exhaust valves are fully closed. The cylinder pressure remains low. The exhaust valves are closed and the cylinder is on an intake stroke.

At engine position p2, the intake valves are still partially open and the cylinder remains deactivated. The exhaust valves are fully closed and pressure in the cylinder begins to increase as the cylinder enters its compression stroke. The port throttle remains closed to trap air in the cylinder.

Between engine position p2 and engine position p3, the central throttle remains fully open and the cylinder remains deactivated. The port throttle is fully closed and pressure rises in the cylinder as air in the cylinder is compressed. The first intake valve is partially open and the second intake valve is fully closed. The exhaust valves are fully closed.

At engine position p3, the central throttle is fully open and the port throttle is fully opened so that pressure in the cylinder may be reduced via flowing air back into the intake manifold from the cylinder across the first intake valve. The first intake valve is partially open and the second intake valve is fully closed. The exhaust valves are fully closed.

Between engine position p3 and engine position p4, the central throttle is fully open and the port throttle is fully opened. The first intake valve is partially opened and the second intake valve is fully closed. The exhaust valves open during the exhaust stroke of the cylinder. The cylinder pressure is reduced.

At engine position p4, the sequence begins to repeat. The second intake valve begins to open and the first intake valve remains partially open. The port throttle remains fully open and the central throttle remains fully open. Alternatively, the port throttle may be fully closed at engine position p4. The cylinder remains deactivated and the exhaust valve is nearly fully closed. Pressure in the cylinder begins to fall as the cylinder begins its intake stroke.

At engine position p5, the port throttle is open to allow air flow into the cylinder during the intake stroke via the first intake valve (e.g., trace 304). Optionally, the intake port throttle may be closed (e.g., trace 304A) to decrease pressure in the cylinder as shown at 314A and increase engine braking power. The particular timing of port throttle closing for trace 304A may be adjusted to control the mass that is in the cylinder at the beginning of the compression stroke. The central throttle remains fully open and the first and second intake valve lifts follow a base valve lift trajectory. The cylinder remains deactivated and the exhaust valve are fully closed. The cylinder pressure remains low. The exhaust valves are closed and the cylinder is on an intake stroke.

At engine position p6, the intake valves are still partially open and the cylinder remains deactivated. The exhaust valves are fully closed and pressure in the cylinder begins to increase as the cylinder enters its compression stroke. The port throttle remains closed to trap air in the cylinder.

In this way, port throttles may be operated in conjunction with a valve decompression actuator to reduce cold air flow and associated cooling of an exhaust after treatment device while providing engine braking. In addition, pressure in the cylinder during a compression stroke may be adjusted via adjusting an engine position at which the port throttle is closed. Closing the port throttle earlier (e.g., 270 crankshaft degrees before top-dead-center compression stroke of the cylinder may reduce pressure in the cylinder during the compression stroke, thereby reducing engine braking. Closing the port throttle later (e.g., 200 crankshaft degrees before top-dead-center compression stroke of the cylinder may increase pressure in the cylinder during the compression stroke, thereby increasing engine braking. The sequence of FIG. 3A may also allow intake manifold pressures to remain at higher levels as compared to an engine with conventional valve lift so that if the engine is reactivated in response to an increase in driver demand torque, the engine may generate a greater amount of torque sooner.

Referring now to FIG. 3B, a second engine operating sequence is shown. The sequence of FIG. 3B is for a single cylinder of an engine that has been deactivated (e.g., fuel flow to the cylinder has ceased) in response to a vehicle braking request or a low driver demand torque. One or more of the engines cylinders may operate with conventional valve timing and lift while a cylinder is operated as shown in FIG. 3B. Further, other engine cylinders may operate as shown in FIG. 3B, but the strokes of the other cylinders are out of phase with the strokes of the cylinder shown in FIG. 3B so that the engine may generate torque at constant crankshaft angular intervals. In addition, the engine's central throttle is fully opened. The engine in this example includes port throttles.

Figure 5:
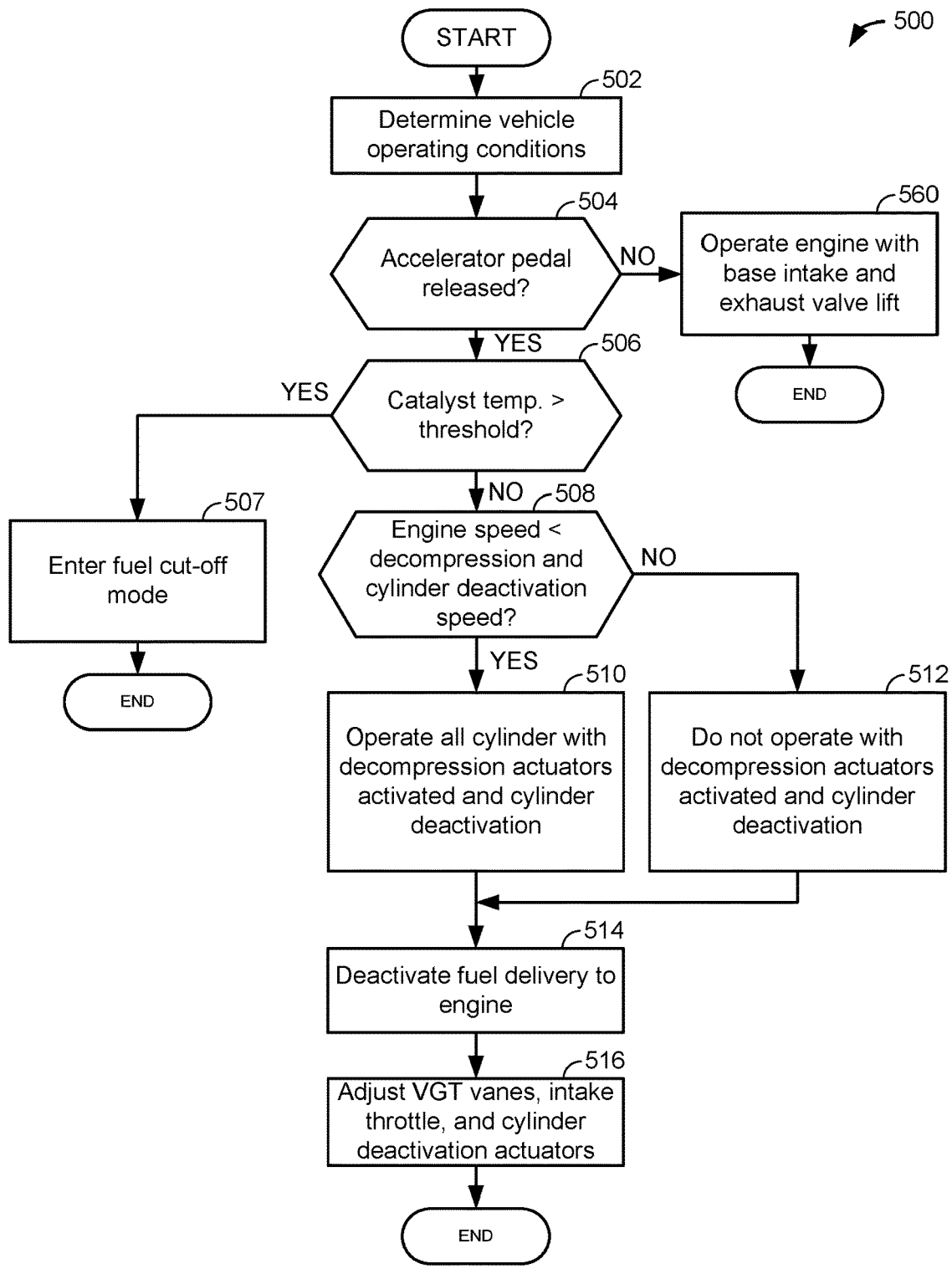

The sequence of FIG. 3B may be provided via the system of FIGS. 1-2B in cooperation with the method of FIGS. 4 and 5. The plots of FIG. 3B are time aligned and occur at a same time. Vertical lines at engine positions p0-p6 represent times of interest during the sequence. A cylinder compression stroke is indicated by the "Comp." abbreviation. A cylinder expansion stroke is indicated by the "Exp." abbreviation. A cylinder exhaust stroke is indicated by the "Exh." abbreviation. A cylinder intake stroke is indicated by the "Int." abbreviation. Vertical bars between the cylinder strokes represent top-dead-center and bottom-dead-center positions of the cylinder. The engine system described herein may operate and include non-transitory instructions to operate at all of the conditions included in the description of FIG. 3B.

The first plot from the top of FIG. 3B represents an opening amount of a central throttle. Trace 320 represents opening amount of the central throttle. The vertical axis represents the opening amount of the central throttle. The central throttle is fully closed when trace 320 is at the level of the horizontal axis. The central throttle is fully open when trace 320 is near the vertical axis arrow. The horizontal axis represents engine position, and engine position is marked to indicate a stroke that the cylinder of the engine is on. For example, at position p10, the cylinder is on its intake stroke. The small vertical lines along the horizontal axis represents top-dead-center and bottom-dead-center locations for the illustrated cylinder strokes indicated along the horizontal axis. The engine rotates from the left side of the figure to the right side of the figure.

The second plot from the top of FIG. 3B represents an opening amount of a port throttle that is in an intake port of the cylinder. In this example, the port throttle controls air flow into the cylinder via a port leading to the first intake valve. The port throttle may restrict flow into and output of both intake ports. However, in some examples, the positions of two port throttles is indicated by trace 322 and the two port throttles may control flow into and out of the cylinder's intake ports. Trace 322 represents opening amount of the port throttle. The vertical axis represents the opening amount of the port throttle. The port throttle is fully closed when trace 322 is at the level of the horizontal axis. The port throttle is fully open when trace 322 is near the vertical axis arrow. The horizontal axis represents engine position, and engine position is marked to indicate a stroke that the cylinder of the engine is on. A small separation between the horizontal axis and trace 322 is shown to increase the visibility of trace 322 even though the port throttle is fully closed when trace 322 is near the horizontal axis.

The third plot from the top of FIG. 3B represents lift of a first intake valve of the cylinder versus engine position. The first intake valve follows a base intake valve trajectory during the intake stroke of the cylinder so that flow into the cylinder may be increased as compared to when the first intake valve lift is at the lower level. The first intake valve does not follow the base intake valve trajectory during the compression, expansion, and exhaust strokes of the cylinder. Trace 324 represents lift of a first intake valve of a cylinder. The lift amount is zero at the level of the horizontal axis and the lift amount increases in the direction of the vertical axis arrow. The lift amount is a distance of the intake valve from the intake valve seat. The horizontal axis represents engine position, and engine position is marked to indicate a stroke that the cylinder of the engine is on.

The fourth plot from the top of FIG. 3B represents lift of a second intake valve of the cylinder versus engine position. The second intake valve follows a base intake valve trajectory throughout the sequence. Trace 326 represents lift of a second intake valve of the cylinder. The lift amount is zero at the level of the horizontal axis and the lift amount increases in the direction of the vertical axis arrow. The lift amount is a distance of the intake valve from the intake valve seat. The horizontal axis represents engine position, and engine position is marked to indicate a stroke that the cylinder of the engine is on. A small separation between the horizontal axis and trace 326 is shown to increase the visibility of trace 326 even though the second intake valve is fully closed when trace 326 is near the horizontal axis. The horizontal axis represents engine position, and engine position is marked to indicate a stroke that the cylinder of the engine is on.

The fifth plot from the top of FIG. 3B represents a plot of cylinder state versus engine position. The cylinder is activated (e.g., receiving and combusting fuel) when trace 328 is at a higher level near the vertical axis arrow. The cylinder is deactivated (e.g., not receiving fuel and not combusting fuel) when trace 328 is at a lower level near the horizontal axis. Trace 328 represents the state of the cylinder. The horizontal axis represents engine position, and engine position is marked to indicate a stroke that the cylinder of the engine is on.

The sixth plot from the top of FIG. 3B represents lift of exhaust valves (e.g., 54 of FIG. 1) versus engine position. Trace 330 represents lift of first and second exhaust valves of the cylinder. The lift amount is zero at the level of the horizontal axis and the lift amount increases in the direction of the vertical axis arrow. The lift amount is a distance of the exhaust valve from the exhaust valve seat. The horizontal axis represents engine position, and engine position is marked to indicate a stroke that the cylinder of the engine is on. A small separation between the horizontal axis and trace 330 is shown to increase the visibility of trace 330 even though the exhaust valves are fully closed when trace 330 is near the horizontal axis.

The seventh plot from the top of FIG. 3B represents pressure in the cylinder. The pressure in the cylinder increases in the direction of the vertical axis arrow. The horizontal axis represents engine position, and engine position is marked to indicate a stroke that the cylinder of the engine is on. Trace 332 represents pressure in the cylinder if the engine does not include a port throttle. Trace 334 represents pressure in the cylinder when the cylinder includes a port throttle that is controlled as shown in the second plot from the top of FIG. 3B.

At engine position p10, the cylinder is deactivated and other cylinders of the engine are also deactivated in a similar manner (not shown). Vehicle braking is requested (not shown) and the central throttle is fully open. The port throttle of the cylinder is fully closed to prevent air flow into the cylinder during the intake stroke of the cylinder. The lift of the first intake valve of the cylinder begins to increase as the first intake valve follows a base profile of a cam beginning at engine position p10. Prior to engine position p10, the first intake valve is held partially open via a decompression valve actuator (e.g., 17 of FIG. 1). The lift of the second intake valve continues to increase as the second intake valve follows a base profile of a cam beginning shortly before engine position p10 (not shown). The exhaust valves are near a fully closed position. Pressure in the cylinder is relatively low and pressure in the cylinder begins to decrease as the piston approaches bottom-dead-center (e.g., p11).

At engine position p11, the port throttle is fully opened to allow air flow out of the cylinder during the compression stroke of the cylinder via the first intake valve (e.g., trace 324). The intake valves are still partially open and the cylinder remains deactivated. The exhaust valves are fully closed and pressure in the cylinder increases as the port throttle is opened. The central throttle remains fully open and the cylinder remains deactivated.

Between engine position p11 and engine position p12, the central throttle remains fully open and the cylinder remains deactivated. The port throttle is fully opened and pressure in the cylinder remains nearly constant since air may flow out of the cylinder via the first intake valve. The exhaust valve remains fully closed and the first intake valve is partially open. The second intake valve continues to follow a base valve lift trajectory and it is fully closed.

At engine position p12, the central throttle remains fully open and the port throttle is fully closed again to prevent air flow from the intake manifold to the cylinder during the expansion stroke via the first intake valve. The pressure in the cylinder decreases as the engine rotates into the expansion stroke. The exhaust valve is fully closed and the second intake valve is fully closed.

At engine position p13, the port throttle is fully opened again to allow air to flow from the intake manifold into the cylinder via the first intake valve. The air flows into the cylinder and pressure in the cylinder increases. The first intake valve is partially open and the second intake valve is fully closed. The exhaust valves are open and the cylinder remains deactivated.

At engine position p14, the sequence begins to repeat. The second intake valve begins to open and the first intake valve remains partially open. The port throttle fully opens and the central throttle remains fully open. The cylinder remains deactivated and the exhaust valve is nearly fully closed. Pressure in the cylinder begins to fall as the cylinder begins its intake stroke.

At engine position p15, the port throttle is fully opened to allow air flow into the cylinder during the intake stroke via the first intake valve (e.g., trace 324). The central throttle remains fully open and the first and second intake valve lifts follow a base valve lift trajectory. The cylinder remains deactivated and the exhaust valve are fully closed. The cylinder pressure remains low. The exhaust valves are closed and the cylinder is on an intake stroke.

In this way, port throttles may be operated in conjunction with a valve decompression actuator to reduce cooling of an exhaust after treatment device while providing engine braking. The sequence shown in FIG. 3B may lower mass flow rates through the engine as compared to the approach that is shown in FIG. 3A. However, the sequence of FIG. 3B may reduce engine pumping power, thereby reducing engine braking as compared to the sequence shown in FIG. 3A, which may make the sequence shown in FIG. 3B.

Figure 3C:
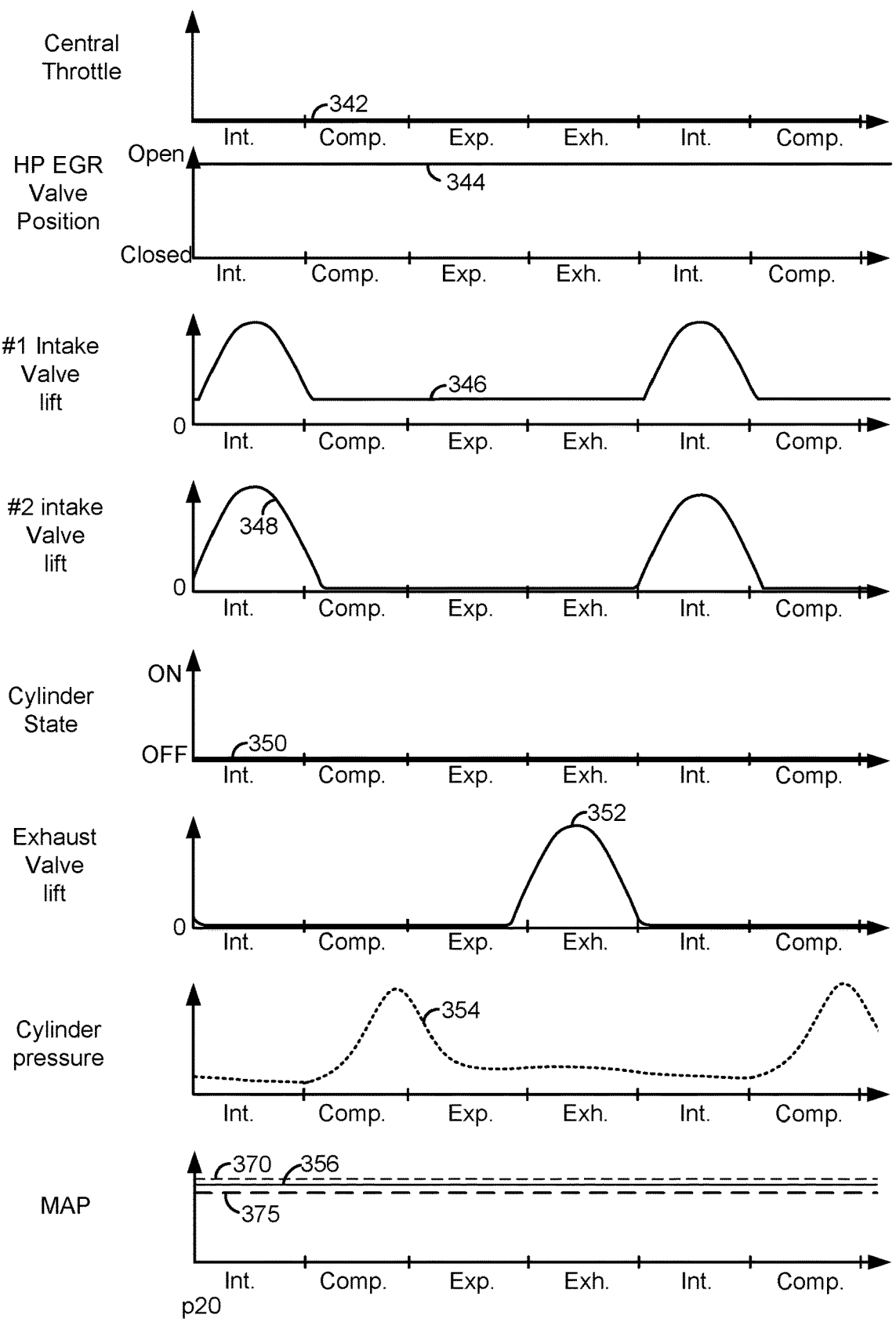

Referring now to FIG. 3C, a third engine operating sequence is shown. The sequence of FIG. 3C is for a single cylinder of an engine that has been deactivated (e.g., fuel flow to the cylinder has ceased) in response to a vehicle braking request for a small amount of braking torque or a lower driver demand torque. All engine cylinders may be operated as shown in FIG. 3C to reduce catalyst cooling. The other engine cylinders may operate as shown in FIG. 3C, but the strokes of the other cylinders are out of phase with the strokes of the cylinder shown in FIG. 3C so that the engine may generate torque at constant crankshaft angular intervals.

The sequence of FIG. 3C may be provided via the system of FIGS. 1-2B in cooperation with the method of FIGS. 4 and 5. The plots of FIG. 3C are time aligned and occur at a same time. A cylinder compression stroke is indicated by the "Comp." abbreviation. A cylinder expansion stroke is indicated by the "Exp." abbreviation. A cylinder exhaust stroke is indicated by the "Exh." abbreviation. A cylinder intake stroke is indicated by the "Int." abbreviation. Vertical bars between the cylinder strokes represent top-dead-center and bottom-dead-center positions of the cylinder. The engine system described herein may operate and include non-transitory instructions to operate at all of the conditions included in the description of FIG. 3C.

The first plot from the top of FIG. 3C is a plot of an opening amount of a central throttle. Trace 342 represents opening amount of the central throttle. The vertical axis represents the opening amount of the central throttle. The central throttle is fully closed when trace 342 is at the level of the horizontal axis. The central throttle is fully open when trace 342 is near the vertical axis arrow. The horizontal axis represents engine position, and engine position is marked to indicate a stroke that the cylinder of the engine is on. In this example, the central throttle is closed from engine position p20 onward. For example, at position p10, the cylinder is on its intake stroke. The small vertical lines along the horizontal axis represents top-dead-center and bottom-dead-center locations for the illustrated cylinder strokes indicated along the horizontal axis. The engine rotates from the left side of the figure to the right side of the figure.

The second plot from the top of FIG. 3C is a plot of an opening amount of a high pressure exhaust gas recirculation (EGR) valve (e.g., 80 of FIG. 1). The vertical axis represents the opening amount of the EGR valve. The EGR valve is fully closed when trace 344 is at the level of the horizontal axis. The EGR valve is fully open when trace 344 is near the vertical axis arrow. The horizontal axis represents engine position, and engine position is marked to indicate a stroke that the cylinder of the engine is on.

The third plot from the top of FIG. 3C is a plot of lift of a first intake poppet valve of the cylinder versus engine position. The first intake valve follows a base intake valve trajectory during the intake stroke of the cylinder so that flow into the cylinder may be increased as compared to when the first intake valve lift is at the lower level. The first intake valve does not follow the base intake valve trajectory during the compression, expansion, and exhaust strokes of the cylinder. Trace 346 represents lift of a first intake valve of a cylinder. The lift amount is zero at the level of the horizontal axis and the lift amount increases in the direction of the vertical axis arrow. The lift amount is a distance of the intake valve from the intake valve seat. The horizontal axis represents engine position, and engine position is marked to indicate a stroke that the cylinder of the engine is on.

The fourth plot from the top of FIG. 3C is a plot lift of a second intake poppet valve of the cylinder versus engine position. The second intake valve follows a base intake valve trajectory throughout the sequence. Trace 348 represents lift of a second intake valve of the cylinder. The lift amount is zero at the level of the horizontal axis and the lift amount increases in the direction of the vertical axis arrow. The lift amount is a distance of the intake valve from the intake valve seat. The horizontal axis represents engine position, and engine position is marked to indicate a stroke that the cylinder of the engine is on. A small separation between the horizontal axis and trace 348 is shown to increase the visibility of trace 348 even though the second intake valve is fully closed when trace 348 is near the horizontal axis. The horizontal axis represents engine position, and engine position is marked to indicate a stroke that the cylinder of the engine is on.

The fifth plot from the top of FIG. 3C is a plot of cylinder state versus engine position. The cylinder is activated (e.g., receiving and combusting fuel) when trace 350 is at a higher level near the vertical axis arrow. The cylinder is deactivated (e.g., not receiving fuel and not combusting fuel) when trace 350 is at a lower level near the horizontal axis. Trace 350 represents the state of the cylinder. The horizontal axis represents engine position, and engine position is marked to indicate a stroke that the cylinder of the engine is on.

The sixth plot from the top of FIG. 3C is a plot of lift of exhaust valves (e.g., 54 of FIG. 1) versus engine position. Trace 352 represents lift of first and second exhaust valves of the cylinder. The lift amount is zero at the level of the horizontal axis and the lift amount increases in the direction of the vertical axis arrow. The lift amount is a distance of the exhaust valve from the exhaust valve seat. The horizontal axis represents engine position, and engine position is marked to indicate a stroke that the cylinder of the engine is on. A small separation between the horizontal axis and trace 352 is shown to increase the visibility of trace 352 even though the exhaust valves are fully closed when trace 352 is near the horizontal axis.

The seventh plot from the top of FIG. 3C is a plot of pressure in the cylinder versus engine position. The pressure in the cylinder increases in the direction of the vertical axis arrow. The horizontal axis represents engine position, and engine position is marked to indicate a stroke that the cylinder of the engine is on. Trace 354 represents pressure in the cylinder for an engine that does not include a port throttle.

The eighth plot from the top of FIG. 3C is a plot of absolute intake manifold pressure (MAP) versus engine position. The vertical axis represents MAP and MAP increases in the direction of the vertical axis arrow. The horizontal axis represents engine position, and engine position is marked to indicate a stroke that the cylinder of the engine is on. Horizontal line 370 represents atmospheric pressure and horizontal line 375 represents a pressure that is 10% lower than atmospheric pressure. Trace 356 represents MAP.

At engine position p20, the cylinder is deactivated and other cylinders of the engine are also deactivated in a similar manner (not shown). The vehicle is coasting (e.g., the accelerator pedal is fully released and driver demand torque is low). Braking is not requested and the central throttle is fully closed. The high pressure EGR valve is fully open and MAP is below atmospheric pressure and above threshold 375. The first intake valve is partially open and the second intake valve is partially open. The cylinder is deactivated and the exhaust valve is nearly fully closed. The cylinder pressure is low. As the engine rotates after position p20 MAP stays substantially constant and flow out the engine exhaust (not shown) is nearly zero due to the closed central throttle, the first intake valve being open, and the EGR valve being fully open. The high MAP may be desirable so that if driver demand torque increases, the intake manifold does not have to fill with fresh air. Consequently, engine torque may be delivered much faster in response to an increasing driver demand torque. In addition, the low flow to the catalyst may help to keep the catalyst warm so that engine emissions may be reduced when the driver demand torque is increased.

Referring now to FIG. 4, a method for operating an engine is shown. In particular, a flowchart of a method for operating an internal combustion engine is shown. The methods of FIGS. 4 and 5 may be stored as executable instructions in non-transitory memory in systems such as shown in FIGS. 1-2B. The method of FIGS. 4 and 5 may be incorporated into and may cooperate with the systems of FIGS. 1-2B. Further, at least portions of the method of FIGS. 4 and 5 may be incorporated as executable instructions stored in non-transitory memory while other portions of the method may be performed via a controller transforming operating states of devices and actuators in the physical world. The controller may employ engine actuators of the engine system to adjust engine operation, according to the method described below. Further, methods 400 and 500 may determine selected control parameters from sensor inputs.

At 402, method 400 determines vehicle operating conditions. Vehicle operating conditions may include but are not limited to engine temperature, accelerator pedal position, catalyst temperature, ambient temperature, ambient pressure, driver demand torque, engine speed, and engine load. Vehicle operating conditions may be determined via vehicle sensors and the engine controller described in FIG. 1. Method 400 proceeds to 404.

At 404, method 400 judges if vehicle braking is requested. Vehicle braking may be requested via a human driver applying a brake pedal. If method 400 judges that vehicle braking is requested, the answer is yes and method 400 proceeds to 406. Otherwise, the answer is no and method 400 proceeds to 460.

At 460, method 400 operates the engine with decompression actuators not activated and with intake and exhaust valve lifts following base intake and exhaust valve lift profiles (e.g., intake valves follow the trajectory of trace 308 and exhaust valves follow the trajectory of trace 312 shown in FIG. 3A). Further, the cylinders may be activated (e.g., receiving fuel and combusting a mixture of air and fuel) and generating torque to meet a driver demand torque. The driver demand torque may be determined via indexing or referencing a function or table via accelerator pedal position and vehicle speed. Method 400 proceeds to exit.

At 406, method 400 judges if the temperature of the catalyst or after treatment device is greater than a threshold temperature (e.g., a catalyst light off temperature). The catalyst light off temperature may be an empirically determined temperature that may be determined via monitoring catalyst efficiency and catalyst temperature. If method 400 judges that the after treatment device temperature is greater than the threshold temperature, the answer is yes and method 400 proceeds to 409. Otherwise, the answer is no and method 400 proceeds to 408.

At 409, method 400 operates the engine with base intake and exhaust valve lift amounts. In one example, the intake and exhaust valves follow lifts of cam lobes of camshafts. The intake valves open during intake strokes of cylinders and the exhaust valves open during exhaust strokes of engine cylinders. In addition, the intake valve decompression actuators are deactivated so that the intake valves follow base cam profiles. The fourth plot from the top of FIG. 3A shows one example of intake valve lift when operating an intake valve via a base cam profile. The sixth plot from the top of FIG. 3A shows one example of exhaust valve lift when operating an exhaust valve via a base cam profile. The engine may generate engine braking torque via at least partially closing vanes of a variable geometry turbocharger or an exhaust throttle and ceasing to supply fuel to the engine's cylinders. Method 400 proceeds to exit.

At 408, method 400 judges whether or not an amount of requested vehicle braking, or alternatively an amount of requested engine braking, is greater than a first threshold amount. The vehicle and/or engine braking amount may be determined via a position of a brake pedal. If method 400 judges that the vehicle braking amount, or alternatively the engine braking amount, is greater than the first threshold amount, the answer is yes and method 400 proceeds to 409. Otherwise, the answer is no and method 400 proceeds to 410.

At 410, method 400 judges whether or not an amount of requested vehicle braking, or alternatively an amount of requested engine braking, is greater than a second threshold amount. If method 400 judges that the vehicle braking amount, or alternatively the engine braking amount, is greater than the second threshold amount, the answer is yes and method 400 proceeds to 414. Otherwise, the answer is no and method 400 proceeds to 412.

At 412, method 400 activates decompression actuators of all cylinders to hold intake valves of all engine cylinders open for an entire cycle of the engine as shown in the third plot from the top of FIG. 3A. The decompression actuators hold the intake valves partially open, but they also allow the intake valves to follow a baseline valve lift profile during intake valve openings that are generated via camshafts (e.g., the intake valve lift profile shown between engine position p0 and engine position p1 in the third plot from the top of FIG. 3A). The engine's central throttle may be fully opened and the exhaust valves of the cylinder may follow a baseline lift profile. FIG. 3A shows one example of valve lifts and timings for a single cylinder of an engine according to step 412. All engine cylinders may operate with intake and exhaust valve lift amounts and timings as shown in FIG. 3A. Additionally, fuel delivery may be ceased to all engine cylinders while the engine is providing braking to the driveline and the vehicle.

Method 400 may also include fully closing vanes of a turbocharger to increase exhaust backpressure. Further, method 400 may at least partially close the intake throttle to control intake manifold pressure. In addition, method 400 may fully open port throttles of a cylinder during at least a portion of expansion strokes of the cylinder, fully open the port throttles of the cylinder during at least a portion of exhaust strokes of the cylinder, and fully open the port throttles of the cylinder during at least a portion of intake strokes of the cylinder. Method 400 may also fully close the port throttles of the cylinder during at least a portion of compression strokes of the cylinder. These port throttle control actions may be applied to each engine cylinder and their respective port throttles. FIG. 3A shows one example of such port throttle timings. However, it should be appreciated that the port throttle timings shown in FIG. 3A may be adjusted to modify engine braking and flow through the engine. Accordingly, the timings are not meant to be limited to only those shown in FIG. 3A.

In other examples, method 400 may fully open port throttles of a cylinder during at least a portion of expansion strokes of the cylinder, and method 400 may fully open the port throttles of the cylinder during at least a portion of compression and exhaust strokes of the cylinder. Method 400 may also fully close the port throttles of the cylinder during at least a portion of intake and expansion strokes of the cylinder. These port throttle control actions may be applied to each engine cylinder and their respective port throttles. FIG. 3B shows one example of such port throttle timings. However, it should be appreciated that the port throttle timings shown in FIG. 3B may be adjusted to modify engine braking and flow through the engine. Accordingly, the timings are not meant to be limited to only those shown in FIG. 3B. Method 400 proceeds to exit.

At 414, method 400 activates decompression actuators of a first group of cylinders to hold intake valves of all engine cylinders open for an entire cycle of the engine as shown in the third plot from the top of FIG. 3A. This approach may be applied when braking demand is low. The decompression actuators of a second group of cylinders may not be activated and the intake and exhaust valve lift profiles of the second group of cylinder may follow base intake and exhaust valve lift profiles. The decompression actuators in the first group of cylinders hold the intake valves partially open, but they also allow the intake valves to follow a baseline valve lift profile during intake valve openings that are generated via camshafts (e.g., the intake valve lift profile shown between engine position p0 and engine position p1 in the third plot from the top of FIG. 3A). The engine's central throttle may be fully opened and the exhaust valves of the cylinder may follow a baseline lift profile. FIG. 3A shows one example of valve lifts and timings for a single cylinder of an engine according to step 414. Additionally, fuel delivery may be ceased to all engine cylinders while the engine is providing braking to the driveline and the vehicle.

Method 400 may also include fully closing vanes of a turbocharger to increase exhaust backpressure. Additionally, method 400 may at least partially close the intake throttle to control intake manifold pressure. Also, method 400 may fully open port throttles of a cylinder in the first group of cylinders during at least a portion of expansion strokes of the cylinder, fully open the port throttles of the cylinder during at least a portion of exhaust strokes of the cylinder, and fully open the port throttles of the cylinder during at least a portion of intake strokes of the cylinder. Method 400 may also fully close the port throttles of the cylinder in the first group of cylinders during at least a portion of compression strokes of the cylinder. These port throttle control actions may be applied to each engine cylinder in the first group of cylinders and their respective port throttles. FIG. 3A shows one example of such port throttle timings. However, it should be appreciated that the port throttle timings shown in FIG. 3A may be adjusted to modify engine braking and flow through the engine. Accordingly, the timings are not meant to be limited to only those shown in FIG. 3A.

In other examples, method 400 may fully open port throttles of a cylinder in the first group of cylinders during at least a portion of expansion strokes of the cylinder, fully open the port throttles of the cylinder during at least a portion of compression and exhaust strokes of the cylinder. Method 400 may also fully close the port throttles of the cylinder in the first group of cylinders during at least a portion of intake and expansion strokes of the cylinder. These port throttle control actions may be applied to each engine cylinder and their respective port throttles. FIG. 3B shows one example of such port throttle timings. However, it should be appreciated that the port throttle timings shown in FIG. 3B may be adjusted to modify engine braking and flow through the engine. Accordingly, the timings are not meant to be limited to only those shown in FIG. 3B. Method 400 proceeds to exit.

In this way, it may be possible to provide vehicle and engine braking while reducing air flow to an exhaust gas after treatment device. By reducing air flow to the exhaust gas after treatment device, it may be possible to maintain after treatment device temperature or reduce a rate at which temperature of the after treatment device declines.

Referring now to FIG. 5, a method for operating an engine is shown. In particular, a flowchart of a method for operating an internal combustion engine is shown. The controller may employ engine actuators of the engine system to adjust engine operation, according to the method FIG. 5.

At 502, method 500 determines vehicle operating conditions. Vehicle operating conditions may include but are not limited to engine temperature, accelerator pedal position, catalyst temperature, ambient temperature, ambient pressure, driver demand torque, engine speed, and engine load. Vehicle operating conditions may be determined via vehicle sensors and the engine controller described in FIG. 1. Method 500 proceeds to 504.

At 504, method 500 judges if vehicle's accelerator pedal is fully released. A fully released accelerator pedal may be the basis for a low driver demand torque. If method 500 judges that vehicle's accelerator pedal is fully released, the answer is yes and method 500 proceeds to 506. Otherwise, the answer is no and method 500 proceeds to 560.

At 560, method 500 operates the engine with decompression actuators not activated and with intake and exhaust valve lifts following base intake and exhaust valve lift profiles (e.g., intake valves follow the trajectory of trace 308 and exhaust valves follow the trajectory of trace 312 shown in FIG. 3A). Further, the cylinders may be activated (e.g., receiving fuel and combusting a mixture of air and fuel) and generating torque to meet a driver demand torque. The driver demand torque may be determined via indexing or referencing a function or table via accelerator pedal position and vehicle speed. Method 500 proceeds to exit.

At 506, method 500 judges if the temperature of the catalyst or after treatment device is greater than a threshold temperature (e.g., a catalyst light off temperature). The catalyst light off temperature may be an empirically determined temperature that may be determined via monitoring catalyst efficiency and catalyst temperature. If method 500 judges that the after treatment device temperature is greater than the threshold temperature, the answer is yes and method 500 proceeds to 507. Otherwise, the answer is no and method 500 proceeds to 508.

At 507, method 500 operates the engine with base intake and exhaust valve lift amounts. In one example, the intake and exhaust valves follow lifts of cam lobes of camshafts. The intake valves open during the intake strokes of cylinders and the exhaust valves open during the exhaust strokes of engine cylinders. In addition, the intake valve decompression actuators are deactivated so that the intake valves follow base cam profiles. The fourth plot from the top of FIG. 3A shows one example of intake valve lift when operating an intake valve via a base cam profile. The sixth plot from the top of FIG. 3A shows one example of exhaust valve lift when operating an exhaust valve via a base cam profile. Fuel delivery to the engine's cylinder also ceases so that the engine enters a fuel cut-off mode. The engine continues to rotate while it is operating in the fuel cut-off mode. Method 500 proceeds to exit.

Alternatively, in some examples, method 500 may activate decompression actuators for each of the engine's cylinders, fully or at least partially open the engine's high pressure EGR valve (e.g., 80 of FIG. 1), and fully close the engine's central throttle. These actions may reduce flow to the exhaust after treatment devices to maintain catalyst temperature and allow MAP to be held at an elevated level (e.g., within 10% of atmospheric pressure) so that if driver demand increases, engine torque output may rapidly meet driver demand. Such operation is shown in FIG. 3C.

At 508, method 500 judges whether or not the present engine speed is less than a threshold speed for activating cylinder decompression actuators and cylinder deactivation. If method 500 judges that the present engine speed is less than a threshold speed for activating cylinder decompression actuators and cylinder deactivation, the answer is yes and method 500 proceeds to 510. Otherwise, the answer is no and method 500 proceeds to 512.

At 510, method 500 activates cylinder decompression actuators in each engine cylinder so that intake valves of each cylinder are held partially open during an entire cycle of the engine. The cylinder decompression actuators may hold intake or exhaust valves open. In addition, method 500 may deactivate selected intake or exhaust valves of the cylinder and hold the deactivated valves in a fully closed position. In one example, method 500 may operate the intake and exhaust valves of each cylinder according to the lift profiles shown in FIG. 3A or 3B.

Method 500 may also open and close port throttles of each engine cylinder according to as shown and described in FIGS. 3A and 3B to further control flow through the engine, if desired. For example, the intake port throttles may be fully opened during at least portions of the compression and exhaust strokes of the cylinder for which the port throttle controls flow. Method 500 proceeds to 514.

At 512, method 500 deactivates decompression actuators in each engine cylinder so that intake and exhaust valves are operated in each cylinder according to base timing and lift amounts. Method 500 proceeds to 514.

At 514, method 500 deactivates fuel delivery to the engine while the engine continues to rotate. Thus, the engine operates in a fuel cut-off mode. Method 500 proceeds to 516.

At 516, method 500 fully closes variable geometry turbocharger turbine vanes to increase exhaust pressure and reduce flow to the exhaust system. In addition method 500 may fully open the engine intake or central throttle so that intake manifold pressure may be high. Increasing the engine intake manifold pressure may allow the engine to respond quicker to increases in driver demand torque. Method 500 proceeds to exit.

Alternatively, in some examples, method 500 may activate decompression actuators for each of the engine's cylinders, fully or at least partially open the engine's high pressure EGR valve, and fully close the engine's central throttle. These actions may reduce flow to the exhaust after treatment devices to maintain catalyst temperature and allow MAP to be held at an elevated level (e.g., within 10% of atmospheric pressure) so that if driver demand increases, engine torque output may rapidly meet driver demand. Such operation is shown in FIG. 3C.

In this way, during conditions of low driver demand torque, at least one intake valve of at least one engine cylinder may be held open for an entire engine cycle to reduce flow to an exhaust after treatment device when the cylinder is deactivated. The reduced flow may help to maintain and/or reduce cooling of an exhaust after treatment device.

Thus, the methods of FIGS. 4 and 5 provides for an engine operating method, comprising: deactivating a cylinder and reducing flow through the cylinder via holding an intake poppet valve of the cylinder open for an entire duration of a cycle of an engine that includes the cylinder in response to a vehicle braking request and a temperature of a catalyst being less than a threshold temperature; and operating an exhaust valve of the cylinder during the cycle. The engine method further comprises not holding the intake poppet valve of the cylinder for the entire duration of the cycle of the engine in response to the braking request and the temperature of the catalyst being greater than the threshold temperature. The engine method further comprises at least partially closing an intake throttle and at least partially closing vanes of a variable geometry turbocharger in response to the vehicle braking request and the temperature of the catalyst being less than the threshold temperature.

In some examples, the engine method further comprises at least partially closing an exhaust throttle in response to the braking request and the temperature of the catalyst being greater than the threshold temperature. The engine method further comprises holding a central throttle fully open while the cylinder is deactivated. The engine method further comprises holding a port throttle of the cylinder closed during at least a portion of an intake stroke of the cylinder. The engine method further comprises holding the port throttle fully closed during a compression stroke of the cylinder. The engine method further comprises holding the port throttle fully open during an expansion stroke of the cylinder. The engine method further comprises holding an exhaust gas recirculation valve at least partially open and a central throttle fully closed during the cycle of the engine.

The methods of FIGS. 4 and 5 also provide for an engine operating method, comprising: opening a central throttle of an engine and holding closed a port throttle of a cylinder of the engine during at least a portion of a compression stroke of the cylinder in response to a request for fueling of the cylinder to be cut-off, the intake stroke of the cylinder occurring during a cycle of the engine; and holding open the port throttle during at least part of an exhaust stroke of the cylinder, the exhaust stroke of the cylinder occurring during the cycle of the engine. The engine method further comprises opening a central throttle of an engine and holding closed a port throttle of a cylinder of the engine during at least a portion of a compression stroke of the cylinder in further response to engine speed being less than a threshold speed. The engine method further comprises holding an intake valve of the cylinder open at least a threshold lift amount for an entire cycle of the engine. The engine method further comprises increasing a lift amount of the intake valve beyond the threshold lift amount during at least a portion of the entire cycle of the engine. The engine method further comprises following a base intake valve lift amount during the portion of the entire cycle of the engine. The engine method further comprises ceasing fuel delivery to the cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
deactivating a cylinder and reducing flow through the cylinder via holding an intake poppet valve of the cylinder open for an entire duration of a cycle of an engine that includes the cylinder in response to a vehicle braking request and a temperature of a catalyst being less than a threshold temperature; and
operating an exhaust valve of the cylinder during the cycle.

2. The engine method of claim 1, further comprising not holding the intake poppet valve of the cylinder for the entire duration of the cycle of the engine in response to the braking request and the temperature of the catalyst being greater than the threshold temperature.

3. The engine method of claim 1, further comprising at least partially closing an intake throttle and at least partially closing vanes of a variable geometry turbocharger in response to the vehicle braking request and the temperature of the catalyst being less than the threshold temperature.

4. The engine method of claim 1, further comprising at least partially closing an exhaust throttle in response to the braking request and the temperature of the catalyst being greater than the threshold temperature.

5. The engine method of claim 1, further comprising holding a central throttle fully open while the cylinder is deactivated.

6. The engine method of claim 5, further comprising holding a port throttle of the cylinder closed during at least a portion of an intake stroke of the cylinder.

7. The engine method of claim 6, further comprising holding the port throttle fully closed during a compression stroke of the cylinder and holding the port throttle fully open during an expansion stroke of the cylinder.

8. The engine method of claim 1, further comprising holding an exhaust gas recirculation valve at least partially open and a central throttle fully closed during the cycle of the engine.

9. An engine system, comprising:
a diesel engine including a cylinder included in a first group of cylinders, a second cylinder included in a second group of cylinders, a central throttle, and an exhaust aftertreatment device, the cylinder including at an intake poppet valve and a decompression actuator to lift the intake poppet valve;
a controller including executable instructions stored in non-transitory memory that cause the controller to deactivate the cylinder and other cylinders included in the first group of cylinders in response to a request for vehicle braking, and additional instructions to hold the intake poppet valve of the cylinder open during an entire cycle of the diesel engine and not to hold intake poppet valves of cylinders included in the second group of cylinders during the entire cycle of the diesel engine in response to the request for vehicle braking.

10. The engine system of claim 9, further comprising:
a central throttle, a port throttle for the cylinder, and a port throttle for each of the other cylinders included in the first cylinder group.

11. The engine system of claim 10, further comprising additional instructions that cause the controller to open the port throttle for the cylinder during at least a portion of an exhaust stroke of the cylinder.

12. The engine system of claim 11, further comprising additional instructions that cause the controller to fully open the central throttle while the request for engine braking is asserted.

13. The engine system of claim 9, where the intake poppet valve is held open via the decompression actuator.

14. The engine system of claim 9, further comprising additional instructions to hold the intake poppet valve of the cylinder open during an entire cycle of the diesel engine in response to a temperature of a catalyst being less than a threshold temperature.

15. An engine operating method, comprising:
   opening a central throttle of an engine and holding closed a port throttle of a cylinder of the engine during at least a portion of a compression stroke of the cylinder in response to a request for fueling of the cylinder to be cut-off, the intake stroke of the cylinder occurring during a cycle of the engine; and
   holding open the port throttle during at least part of an exhaust stroke of the cylinder, the exhaust stroke of the cylinder occurring during the cycle of the engine.

16. The engine method of claim 15, further comprising opening a central throttle of an engine and holding closed a port throttle of a cylinder of the engine during at least a portion of a compression stroke of the cylinder in further response to engine speed being less than a threshold speed.

17. The engine method of claim 15, further comprising holding an intake valve of the cylinder open at least a threshold lift amount for an entire cycle of the engine.

18. The engine method of claim 17, further comprising increasing a lift amount of the intake valve beyond the threshold lift amount during at least a portion of the entire cycle of the engine.

19. The engine method of claim 18, further comprising following a base intake valve lift amount during the portion of the entire cycle of the engine.

20. The engine method of claim 19, further comprising ceasing fuel delivery to the cylinder.

* * * * *